Figure 1:
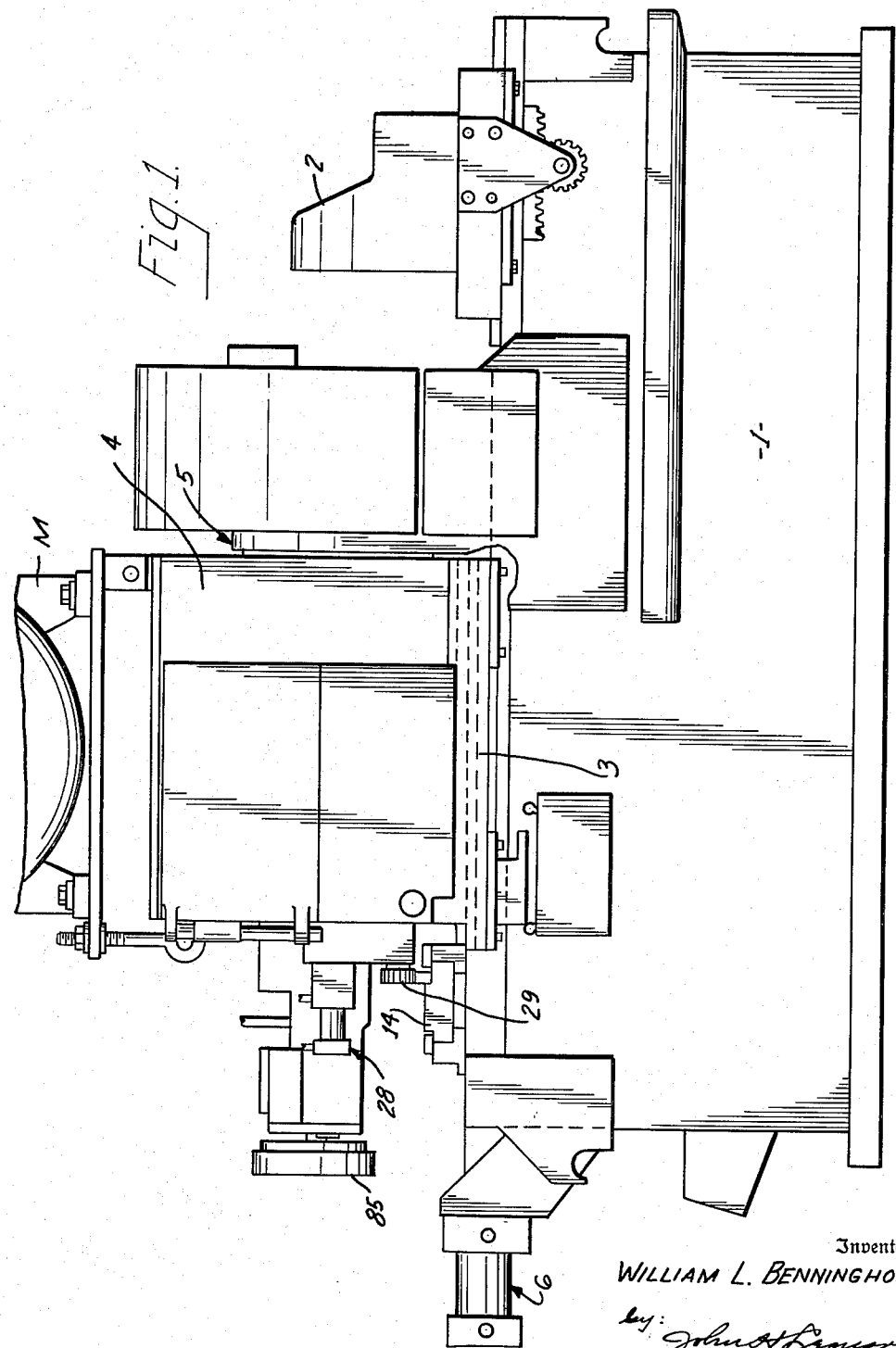

Inventor
WILLIAM L. BENNINGHOFF

Fig. 3A.

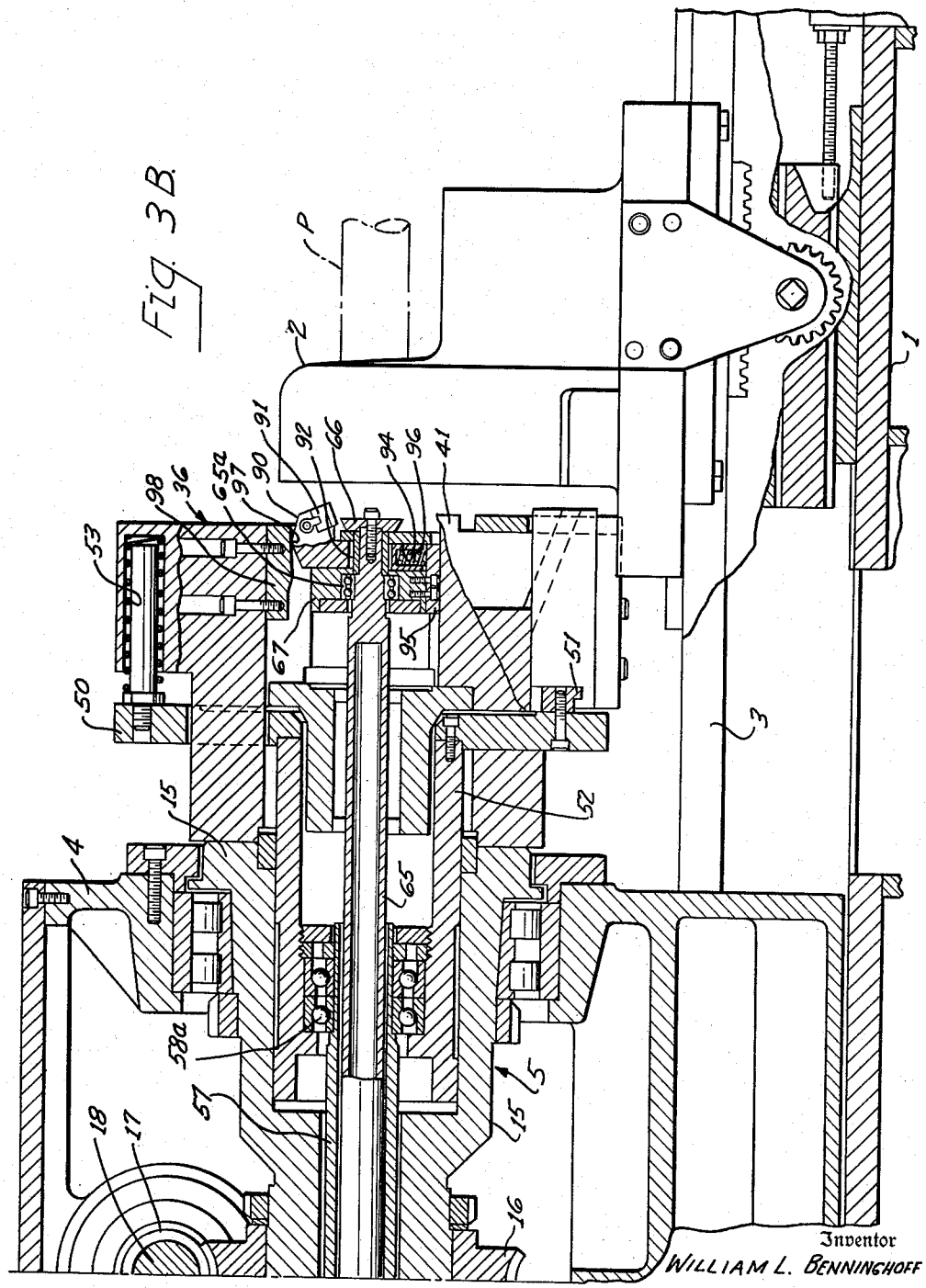

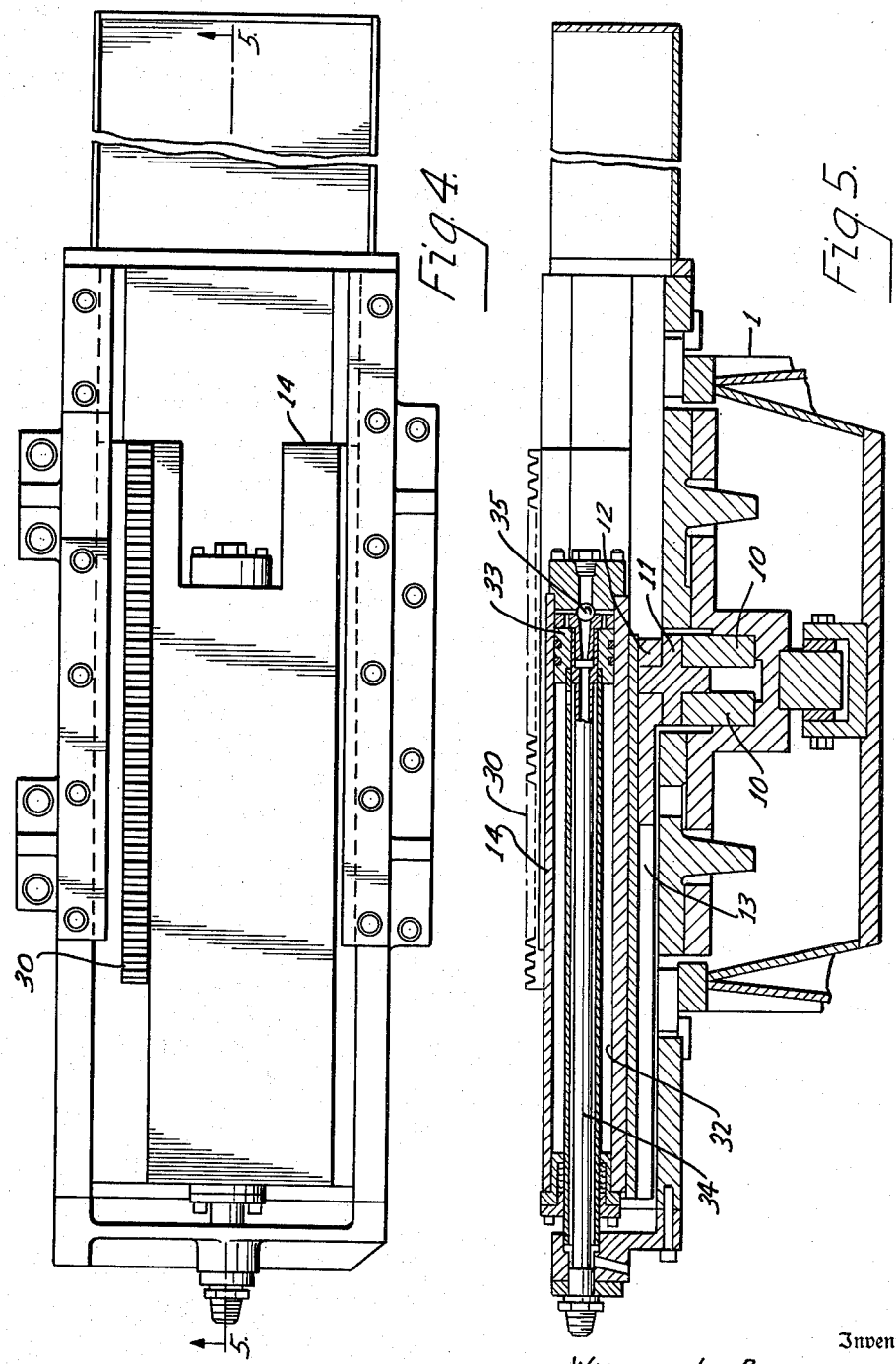

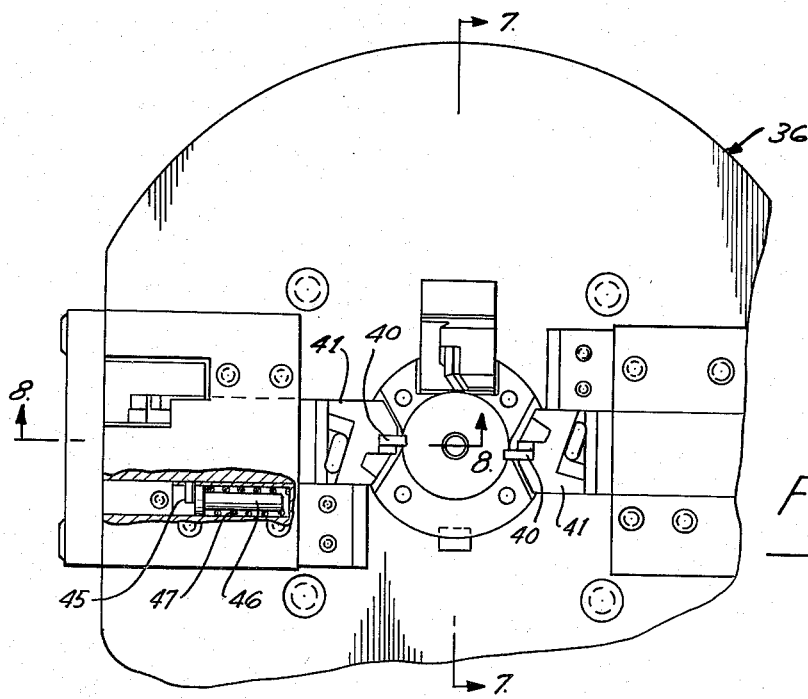
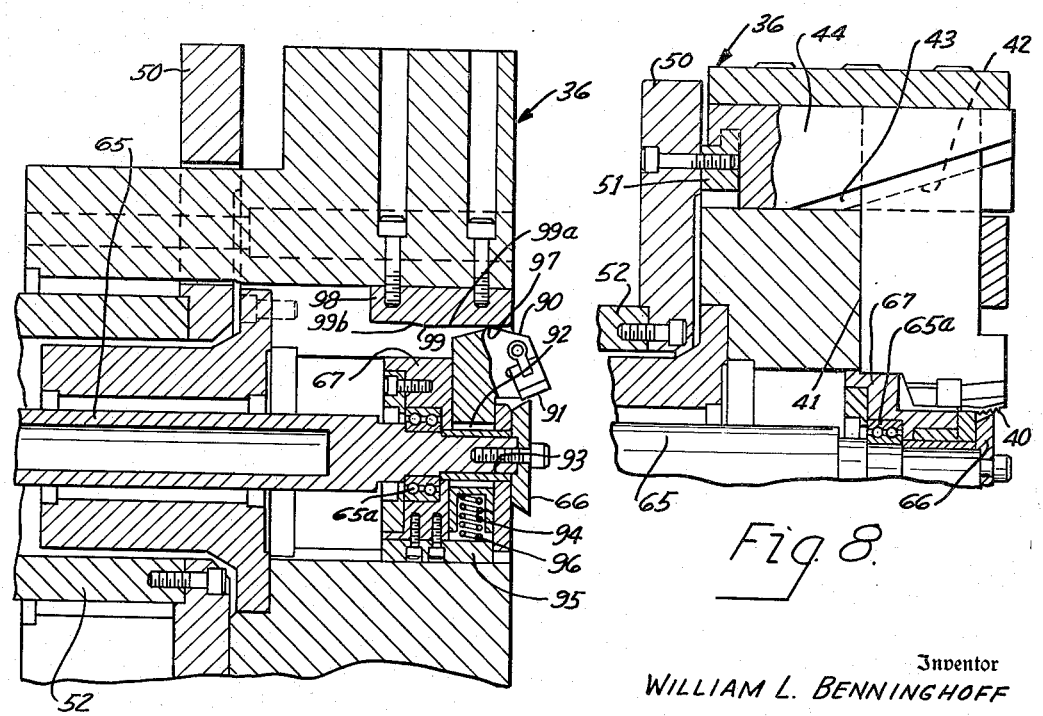

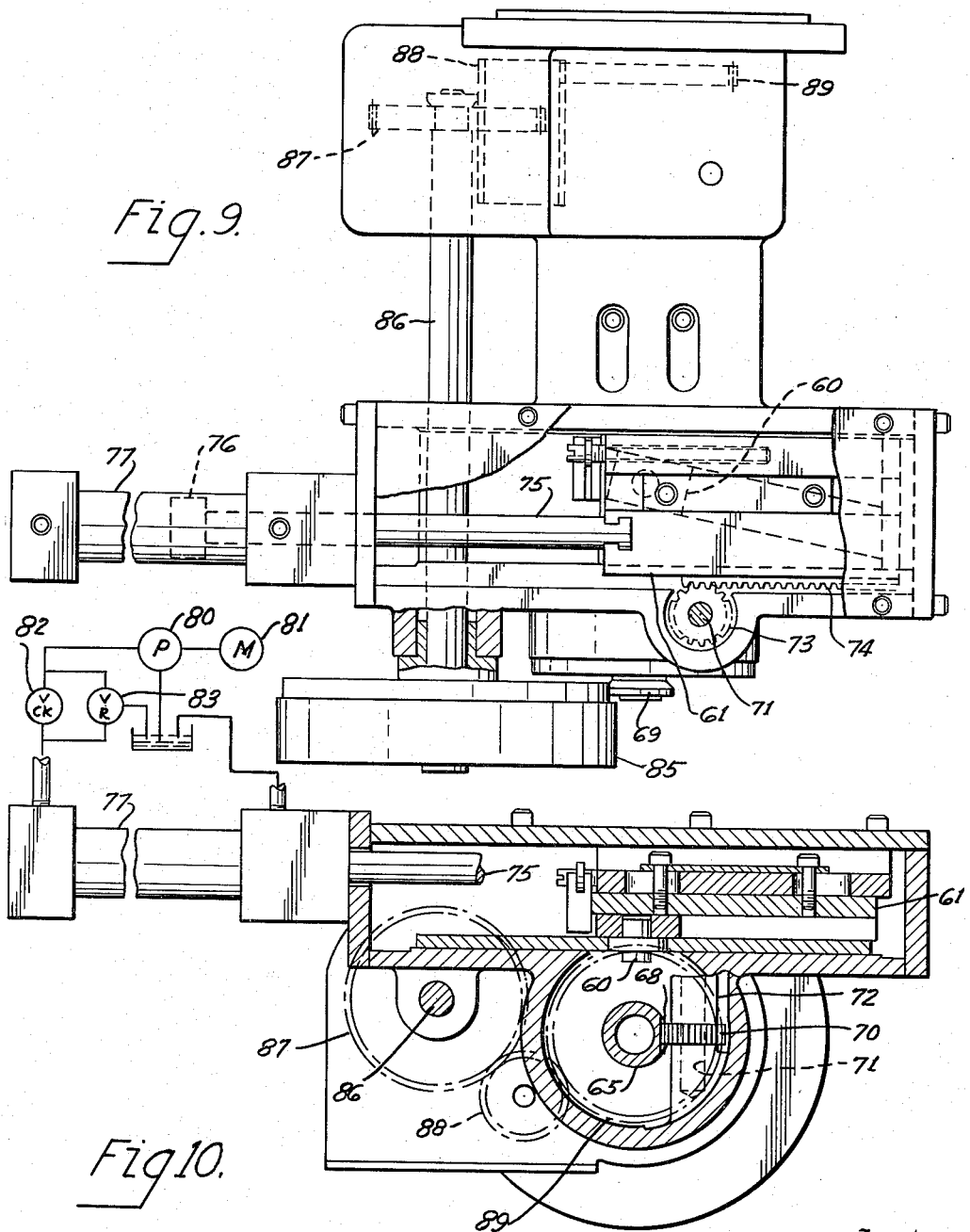

Aug. 22, 1961
W. L. BENNINGHOFF
AUTOMATIC TAPER THREAD FORMING AND
CHAMFER CUTTING MACHINE
2,996,736
Filed Aug. 22, 1958
8 Sheets-Sheet 8
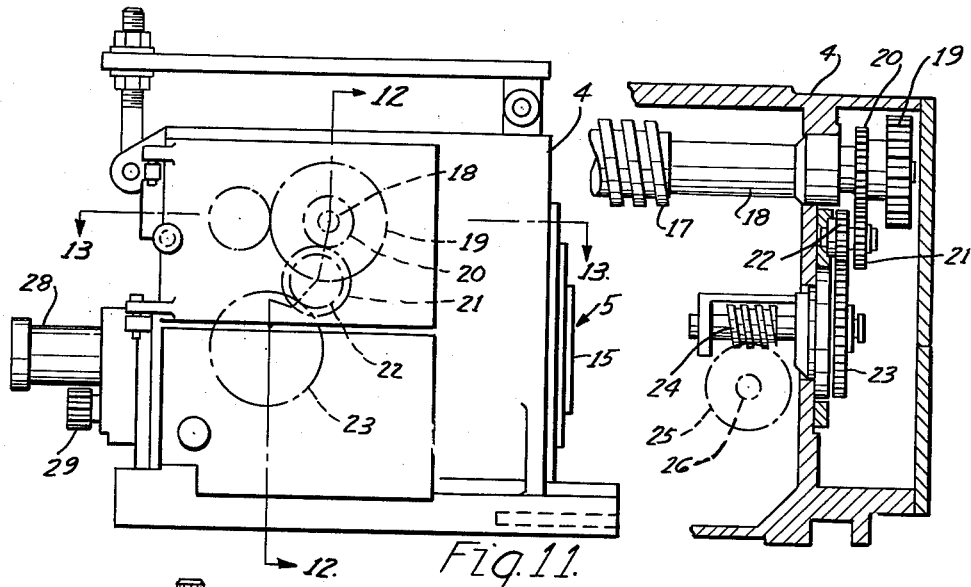
Fig.11.
Fig.12.
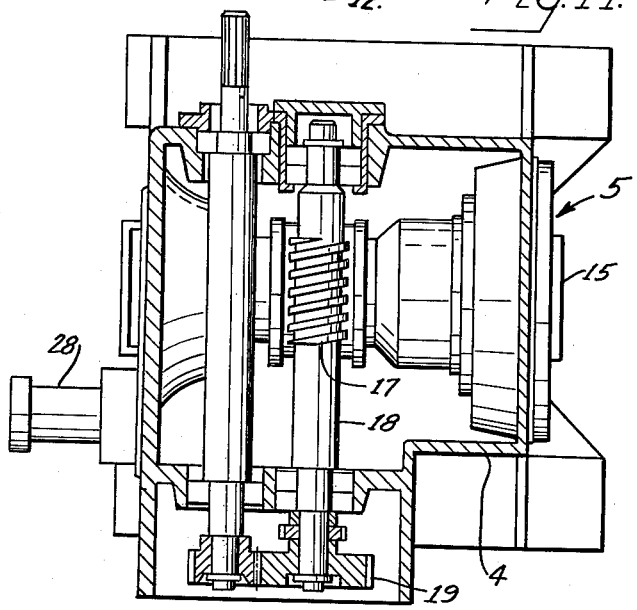
Fig.13.
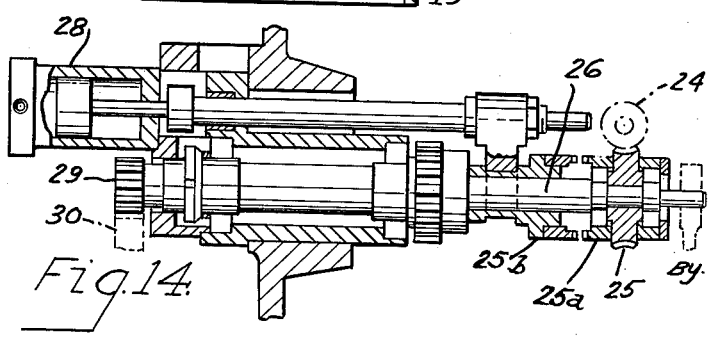
Fig.14.
Inventor
WILLIAM L. BENNINGHOFF
By
John A. Leonard
His Attorney.

United States Patent Office 2,996,736
Patented Aug. 22, 1961

2,996,736
AUTOMATIC TAPER THREAD FORMING AND CHAMFER CUTTING MACHINE
William Leroy Benninghoff, Waite Hill Road, Willoughby, Ohio
Filed Aug. 22, 1958, Ser. No. 756,556
9 Claims. (Cl. 10—87)

This invention relates to automatic tapered thread forming machines, and particularly to an improved feed mechanism by which the advance or recession of the chasers relative to the spindle axis is initiated by the proper positioning of the head relative to the pipe to be threaded, instead of in relation to the conventional pipe holding chuck, regardless of whether or not the pipe or sleeve is located in a preselected axial position in the associated holding chuck.

For purposes of illustration, the invention and its advantages are described in relation to threading pipes, its use in the internal threading of union for pipes, rods, and the like, being apparent from the illustrative example.

Specifically, the invention relates to an improvement in thread forming machines in which the spindle can be advanced axially toward the chuck or the chuck toward the spindle head, as the case may be, so as to effect the relative axial travel of the one toward the other, and in which there is carried by the spindle a suitable stop or pipe or union-engaging control member which, upon endwise engagement with the pipe or union, regardless of the extent the pipe or spindle may have traveled axially prior to engagement endwise, initiates the advance or recession of the chasers relative to the spindle axis so that the thread formed always is the proper preselected diameter for each pipe or union at the beginning of the threading operation, and the taper is consistent throughout the entire threading operation.

The invention comprises generally an improvement on the automatic taper thread forming machine disclosed in United States Patent No. 2,679,057, issued May 25, 1954, to Neil T. Sawdey.

In the prior patent above referred to, provision is made for effecting the relative approach and recession of a work-holding chuck and spindle with chasers carried on the spindle and arranged to recede gradually and uniformly from their initial preselected starting positions, depending upon the relative position of the chuck and head, regardless of the axial position of the pipe.

In connection with prior machines, the transfer tables for feeding the pipe to the chuck sometimes do not position the pipe sufficiently accurately in position endwise to assure that the end of the pipe first engaged by the chasers will be engaged at the same initial preselected inner starting position of the chasers. Therefore, care must be taken to position manually each piece of pipe if precision and uniformity of thread and taper throughout a group of pipes is to be maintained.

In accordance with the present invention, means in the machine are arranged to engage the pipe, as the spindle and chuck are fed relatively toward each other by moving the chuck or the spindle, and by engagement with the pipe, to initiate and continue the advance or recession of the chasers. This arrangement affords a distinct advantage in that, even though the pipe can be positioned axially in the chuck only approximately in position endwise, the machine will operate in the usual manner and begin the threading operation only in proper relation with respect to the end of the pipe rather than in respect to the relative location of the chuck and head, as in the prior patent.

Figure 2:
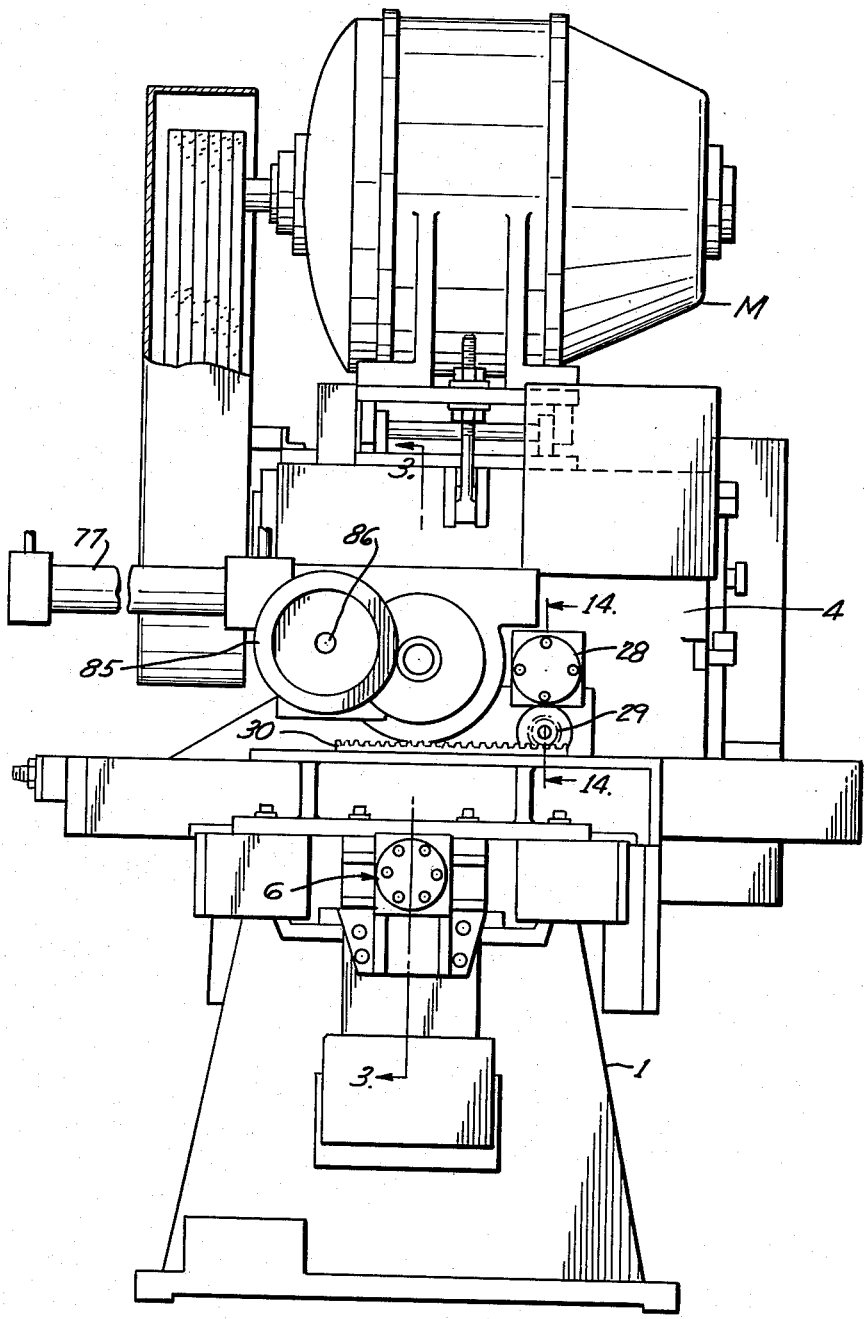

Various other objects and advantages of the invention will become apparent from the following description wherein reference is made to the drawings, in which:

FIG. 1 is a side elevation of a machine embodying the principles of the present invention;
FIG. 2 is a left end elevation of the machine illustrated in FIG. 1;
FIGS. 3A and 3B are the left and right end vertical longitudinal sectional views through the spindle axis of the machine and are taken on line 3—3 of FIG. 2;
FIG. 4 is an enlarged plan view of the sine bar mechanism employed for causing relative approach of the spindle and chuck;
FIG. 5 is a similarly enlarged vertical sectional view taken on the line 5—5 of FIG. 4 and showing the sine bar mechanism and portions of the control therefor;
FIG. 6 is a front elevation of a cutter mechanism housing structure;
FIG. 7 is a vertical sectional view taken on the line 7—7 of FIG. 6;
FIG. 8 is a fragmentary sectional view taken on the line 8—8 of FIG. 6;
FIGS. 9 and 10 are a fragmentary top plan view and left end elevation, respectively, of part of the sine bar control mechanism embodied in the present invention;
FIG. 11 is a front elevation of the cutter mechanism housing structure detached from the machine;
FIG. 12 is a fragmentary vertical sectional view taken on the line 12—12 of FIG. 11;
FIG. 13 is an enlarged sectional view of the spindle drive mechanism, taken on line 13—13 of FIG. 11, and
FIG. 14 is an enlarged sectional view of the clutch mechaninsm and is taken on line 14—14 of FIG. 2.

Referring to the drawings, a machine for forming external threads on pipe, and embodying the present invention, is shown for illustration, and comprises a frame or bed 1 on which is mounted a work holding chuck 2 which is adapted to grip a length of pipe fed to its by a transfer mechanism and to hold the pipe in fixed axial position relative to the chuck with one end projecting toward the spindle of the machine for purposes of threading.

Mounted on suitable slideways 3 on the bed 1 is a spindle carriage 4 in which is rotatably mounted a spindle assembly, indicated generally at 5. The carriage 4, and the operating mechanism carried thereby, are mounted on the slideways 3 so that the carriage 4 can be reciprocated along the frame 1. Thus the spindle and the work holding chuck 2 can be moved relatively toward and away from each other axially of the pipe.

As more fully described in the above-identified patent, it is desirable that the spindle carriage be arranged for a rapid traverse axially from a starting position to the position in which the threading operation is to be initiated.

For this purpose, there is secured to the frame 1 of the machine a suitable hydraulic piston and cylinder assemblage 6 comprising a cylinder 7 and a piston 8 having a piston rod 9 which is connected to a slide 10. The slide 10 is reciprocable forwardly and rearwardly along suitable guideways on the bed 1. The slide 10 carries a suitable pin 11, with a follower 12 thereon, the follower 12 being slidable in a suitable slideway or groove 13 in a sine bar 14.

Prior to the initiation of the threading operation by the feed of the spindle carriage axially, of the spindle, the sine bar 14 is held stationary in an advanced position. Consequently, upon the introduction of fluid into the head end of the cylinder 7, the slide 10 is moved in the direction in which the spindle carriage 4 is to be advanced. So long as the sine bar 14 is held in fixed position relative to the spindle carriage, the connection between the piston rod 9 and the carriage 4 of the spindle is a direct connection and the spindle carriage 4 and rod 9 move as a unit endwise of the spindle.

The rapid traverse and direct drive of the spindle carriage 4 by the assemblage 6 is stopped by a suitable means, preferably by the piston 8 reaching the rod end of the cylinder. When held in this position, the slide 10 is held rigidly and firmly in its forwardmost position and, in this position, the feeding of the spindle carriage for the threading operation is begun.

For this purpose, the slot 13 of the sine bar 14 is on a bias to the direction of sliding of the sine bar and, consequently, as the sine bar 14 is slid transversely of the direction of movement of the slide 10, it advances or retracts the spindle carriage 4, depending upon its direction of movement. Preferably, this is done in timed relation to the rotation of the spindle, as will now be described.

The spindle, indicated generally at 15, is provided with a main driving gear 16 which is driven by a suitable power driven worm gear 17. The worm gear is mounted on a shaft 18 which is driven by a suitable gear 19 which, in turn, is driven through suitable means by a motor M carried on the carriage 4.

Connected to the shaft 18, through suitable speed reduction gears 20, 21, 22, and 23, is a worm gear 24. This worm gear 24 drives a cooperating gear 25 which is rotatable with a clutch element 25a. A complementary clutch element 25b is rotatable with and slidable axially on the shaft 26 and is arranged to be slid axially thereof by a suitable piston and cylinder assemblage 28 so as to couple the gear 25 drivingly to the shaft 26. The shaft 26, in turn, drives a suitable pinion 29 which engages a rack 30 carried on the sine bar 14.

As is apparent, the sine bar extends transversely of the machine and the rack extends parallel to the direction of travel of the sine bar. Accordingly, with the spindle operating and the clutch elements 25a and 25b engaged, the shaft 26 is driven in a predetermined timed relation to the rotation of the spindle and, in turn, drives the sine bar through the pinion 29, and the rack 30 on the sine bar, so that the sine bar 14 moves at a predetermined lineal rate of speed relative to the rotary speed of the spindle. This cooperation effects the advance of the spindle carriage by the sine bar 14 and thereby effects the advance of the spindle in relation to the rotation of the spindle, thus determining the pitch of threads.

As illustrated in FIG. 5, the sine bar 14 is yieldably urged in a direction away from that in which it is driven by the rack and pinion so as to eliminate, as near as may be, any slack in the drive. For this purpose, the sine bar is provided with a cylinder 32 in which is reciprocable a piston head 33 having a rod 34. The cylinder, in the form illustrated, is connected to the sine bar 14 and the rod 34 of the piston is connected to the carriage 4 of the machine. The structure is arranged so that pressure fluid can be admitted to one end of the cylinder to resist yieldably the movement of the sine bar 14 in the direction in which it is driven by the rack 30 and pinion 29 for advancing the spindle carriage 4.

A suitable check valve 35 is provided, this valve being set at a predetermined release pressure so that the maximum pressure resisting movement of the sine bar 14 by its rack 30 and pinion 29 can be predetermined. By admitting pressure fluid to the opposite side of the piston, the sine bar can be retracted at the end of the advance movement of the carriage of the spindle.

As more fully described in the above-identified patent, the spindle carries a cutter head 36 in which are mounted several chasers 40. Each chaser is mounted on a cutting tool carriage which may be in the form of a chaser block 41 which is slidable radially of the spindle and, in the case of external threads, is moved inwardly to a contracted position from which it subsequently recedes to provide the tapered threads. The recession is dependent upon the movement of the spindle 15 and its head 36 relatively toward the chuck 2.

For moving the carriages or blocks 41 radially, each block is provided with a spline 42, as best shown in FIG. 8, which engages a suitable bias groove or slot 43 in an associated cam block 44. Each cam block is arranged to slide parallel to the axis of the spindle in opposite directions, selectively, and in so doing, to recede and advance its associated chasers 40, moving the chasers inwardly toward the axis of the spindle as the blocks 44 are moved forwardly and permitting the chasers to move outwardly as the blocks are retracted. Each carrier block 41 is provided with a pin 45 which is engageable by suitable plunger 46 driven by a spring 47. Thus, as the cam blocks 44 are moved rearwardly relative to the spindle head, the chaser blocks recede from the axis, thus gradually increasing the diameter of the thread and providing a taper thread.

In order to advance and retract the cam blocks 44, a suitable power transmitting means, in the form of a plate 50, is connected to them by means of a suitable clamping block 51. The plate 50 is coaxial with the spindle and has a portion or collar 52 disposed within the spindle and slidably mounted therein for axial reciprocation. The plate 50 is normally urged in a direction away from the spindle by means of suitable springs 53. Thus it is continuously urged by the springs in a direction for causing outward recession of the chaser blocks 41.

The structure thus far described is broadly that disclosed in the Sawdey Patent No. 2,679,057.

The collar 52 is rotatably mounted in coaxial relation to a tubular push rod or sleeve 57 by means of bearings 58a, the bearings being operative for connecting the collar 52 and rod or sleeve 57 for movement together axially of the spindle.

The rod or sleeve 57, in turn, carries a suitable piston 58 which is operable in a cylinder 59 for reciprocation axially of the spindle. The cylinder 59, in turn, is movable axially of the spindle by means of a follower 60 which cooperates with a sine bar 61 which is slidable laterally of the machine and spindle axis. Fluid pressure can be admitted to each end of the cylinder 59, selectively, and the other end vented.

In the Sawdey patent, the sine bar, corresponding to the sine bar 61 which herein controls the operation of the advance and retraction of the cylinder 59, was driven by a sine bar corresponding to the sine bar 14 herein. The latter sine bar therein advanced and retracted the entire spindle carriage. Therefore, the point of initiation of the expansion or recession of the chasers was dependent upon the relative position of the carriage along the frame with respect to the chuck.

In accordance with the present invention, this initiation of the recession of the chasers and the control of their recession is controlled in relation to the position of the end of the pipe to be threaded, regardless of whether the pipe is in the same axial position in each instance relative to the chuck 2 or to the spindle head 36 at the beginning of the rapid advance, and sine bar advance, of the carriage of the spindle.

For this purpose, a suitable hollow rod 65 is mounted in coaxial position with respect to the spindle and is supported at its forward end on suitable roller bearings 65a. At its forward end, the rod 65 carries a pipe engaging pad 66. The roller bearings 65a are mounted in a suitable block 67 arranged in the bore of the spindle for movement axially thereof and for rotation therewith. The rod 65 extends from its forward end entirely to, and through, the sleeve 57 and the rear of the spindle. At a portion beginning a short distance from the rear of the housing, the rod 65 is provided with a suitable rack 68 which is secured in a fixed adjusted relation on the rod 67 by means of a suitable nut 69. The rack 68 is engaged with a suitable pinion 70 which is mounted for rotation about an upright shaft 71 on the spindle carriage. For this purpose, the pinion 70 is provided on one end of the sleeve 72, the upper end of which carries a pinion 73 which engages a rack 74 on the sine bar 61.

Thus, the movement of the sine bar 61 in opposite directions is dependent upon the movement of the rack 68 and, therefore, of the rod 65 forwardly and rearwardly parallel to the axis of the spindle. The sine bar 61 is connected to the rod 75 of a suitable piston 76 operable in a cylinder 77 to which pressure may be admitted at either end for advancing or retracting the sine bar. Generally, the piston and cylinder arrangement is such that the piston opposes movement of the sine bar in a direction for retracting or receding the chasers away from the spindle axis, which, in the form illustrated in FIG. 9, is to the left. In order to maintain a predetermined pressure in the head end of the cylinder 77 to resist the movement of the sine bar yieldably against the driving force of the rack 68 and pinion 73, the pressure fluid is supplied to the head end of the cylinder 77 by means of a suitable pump 80 driven by a motor 81. Interposed between the head end of the pump and the cylinder is a check valve 82 which permits the flow to the head end of the cylinder but prevents the return therefrom. Connected in a by-pass circuit around the check valve is an adjustable relief valve 83. Thus, pressure fluid, supplied by the pump to the head end of the cylinder 77, is ample to return the sine bar 61 to the starting position when such is permitted by the proper movement of the rack 68 and rod 65. However, when the sine bar 61 is being moved in the opposite direction, during the threading operation, for receding the chasers, the pressure in the head end of the cylinder must discharge through the relief valve 83 which, being set for a predetermined pressure, maintains a yieldable and substantially constant resisting force against the travel of the sine bar in the direction for receding the chasers.

As a result, as the carriage and the chuck are brought relatively toward each other, for example, by advancing the carriage as herein described, the end of the pipe P engages the pad 66 on the forward end of the rod 65. At the time of engagement, the rod 65, and consequently the rack 68, is in its most forward position and the sine bar 61 is in the right-hand position, as illustrated in FIG. 9. In this condition, it has forced the cylinder 59 and the piston 58 to the extreme right-hand position, thus forcing the sleeve 57 to the right and moving the plate 50 to its most forward position, wherein it has moved the chasers inwardly to the most inward position, or contracted position, relative to the axis of the spindle.

Upon engagement of the pipe with the pad 66, the movement of the rod 65 relative to the spindle carriage is initiated, the rod 65 moving to the left relative to the carriage. This may be effected either by moving the chuck toward the spindle carriage or by moving the spindle carriage toward the chuck, as described in the Sawdey patent. For the purposes of illustration, the form of machine in which the spindle carriage is moved toward the chuck will be described.

Continued movement of the spindle carriage toward the chuck thus drives the rod 65 to the left relative to the spindle carriage, thereby moving the rack to the left and causing it to rotate the pinions 70 and 73 and thereby drive the rack 74 of the sine bar 61, thus urging the sine bar to the left against the resistance of the piston and cylinder assemblage 77. As the sine bar moves to the left, it imposes a movement, to the left, of the cylinder 59. Since the piston 48 is operable in the cylinder 59 and is urged to the right by the fluid pressure between the left end of the piston and the cylinder, the recession of the cylinder 59 permits the piston to recede to the left, always, however, while yieldably urged and held against the opposite end of the cylinder by fluid pressure. Thus a yieldable connection is provided. The movement of the piston to the left draws with it the rod 57 which, through the medium of the collar 52, bearings 58, and plate 50, permits the plate 50 to retract from the spindle head 36. This retraction of the plate 50, under the control of the sine bar 61, thus causes the chasers to recede from the axis of the pipe and provide a taper cut.

At the end of the threading operation, the pipe is still in engagement with the pad 66. Thereupon, fluid pressure is admitted to the right of the piston 58, the cylinder being vented at its left end. The piston 58 moves to the left relative to the cylinder and further recedes the chaser blocks so that before return of the head the chasers are clear of the pipe and the pipe can readily be removed axially.

Thus the piston 58 and cylinder 59 provide an extensible and retractable means drivingly interconnecting the sine bar and pipe engaging device or rod 57. This extensible and retractable means, when held in extended or retracted position, causes the rod 57 and sine bar 61 to move in predetermined relation to each other, but it can be moved from retracted to extended condition and vice versa to cause the member to move independently of the movement of the sine bar.

Upon return of the spindle carriage, the effect is a relative motion of the rod or pipe 65 in the advance direction of the spindle carriage, which, due to the pressure in the cylinder 77, restores the sine bar 61 to its starting position and returns the pipe or rod 65 and rack 68 to their starting positions relative to the spindle carriage.

It is apparent, therefore, that regardless of the axial position of the pipe at the beginning of the advance of the spindle carriage, the chasers 40 remain in their innermost position until engagement of the pipe with the pad 66, and thereupon the recession of the chasers away from the axis of the pipe from their innermost preselected position is initiated and continues under the accurate control of the rack, pinions, and sine bar with the slack eliminated by the yieldable pressure fluid supplied to the cylinder 77. Thus an accurate thread, beginning at exactly the proper diameter and continuing to the end of the threading operation, regardless of the original axial position of the pipe, is obtained.

In some instances, as disclosed in said patent, it is desirable to adjust the position of the sleeve 57 endwise relative to the piston 58. For this purpose, a hand wheel 85, having a shaft 86, is mounted in the carriage and carries a gear 87 which is in mesh with an idler gear 88 in the carriage. The idler gear is elongated axially and is in mesh with a gear 89 fixed in position on the rod 57.

The sleeve 57 and piston 58 are in threaded engagement at their ends. Rotation of the gear 83 by the wheel 85 rotates the rod 57 relative to the piston 58, causing the piston and rod assemblage to extend or retract, depending on the direction of rotation of the hand wheel 85.

In most instances, it is desirable to chamfer the end of the pipe during threading.

In order to effect such chamfering, a carrier 90 is mounted in the block 67 and carries a detachable chamfer tool 91. The block 90 has a passage 92 which extends endwise of the rod 57 and which is somewhat larger in diameter than the outer end 93 of the sleeve 57 so that the block 90 can reciprocate radially relative to the rod 57 and spindle. The block 90 is mounted in suitable radial slideways 94 in the block 67 and is connected by a key 95 to the wall of the spindle head so as to be constrained to rotate with the spindle about the axis of the spindle.

Interposed between the block 90 and the key 95 is a spring 96 which urges the block 90 radially of the spindle axis. At the opposite end of the block 90 from the spring 96, the block is provided with a cam surface 97 which is arranged to engage a cam 98 carried by the spindle and rotatable therewith. The cam 98 has an entry surface 99 which is tapered or slopes inwardly radially of the axis of the spindle for a predetermined distance to a point 99a, and then recedes abruptly from the spindle axis, as at 99b. Thus, as the block 67 is moved axially inwardly relative to the spindle head or spindle, or to the left in FIG. 3, the surface 97 of the block 90 rides along the cam surface 99 of the cam 98 so that the block is forced gradually inwardly radially from an inactive position to operating positions. This movement continues until the point 99a is reached at which point the tool 91 has been moved to its radially innermost position and the chamfer completed. Thus the chamfer tool is applied gradually as the pipe passes axially further into the spindle head during threading until the cam surface of the block 97 passes the point 99a, whereupon the surface 99b allows the block 90 to move radially outwardly and remove the chamfer tool 91 from operating position to an inoperative position in which it is out of contact with the stock.

The chamfering device and the threading devices are so arranged with respect to each other that the chamfering operation is performed during the threading operation, thereby assuring better cooperation of the chasers and stock. By starting the chamfering and threading concurrently, the chamfer tool removes the initial threading burrs so that they do not scratch or otherwise injure the threads.

The chamfering device may be used separate and apart from the threading machine if desired.

Having thus described my invention, I claim:

1. In a machine tool including a housing, a power driven rotary spindle carried thereby, a work piece holding chuck, traversing power means to drive the spindle housing and chuck endwise relatively toward each other, a cutting tool carriage supported on the spindle for rotation therewith and movement inwardly and outwardly laterally relative thereto, a member extending endwise of the spindle, means supporting the member for movement endwise relative to the spindle in opposite directions endwise of the spindle and housing, power transmitting means rotatable with the spindle and drivingly connecting the member to the carriage for moving the carriage generally radially of the spindle in one direction when the member and spindle are moved endwise relative to each other in a predetermined direction, a work piece engaging device including a stop adapted to engage the end of a work piece held in the chuck and extending endwise through the spindle and being supported for movement endwise in opposite directions relative to the spindle and member, mechanism drivingly connecting the device and member and constraining the carriage to move in said one direction incrementally in a predetermined relation to the increments of endwise relative movement of the device and spindle upon movement of the spindle and chuck relatively toward each other by the traversing power means while the device is engaged by a work piece in the chuck, said mechanism including a sine bar, means drivingly connecting the device to the sine bar for moving the sine bar in predetermined relation to said endwise relative movement of the device and spindle, retractible and extensible means drivingly interconnecting the sine bar and member and including a pair of elements connected together for movement relative to each other to an extended position and to a retracted position, one of said elements being connected to said member for movement in predetermined relation to the endwise movement of the member, the other element being connected to the sine bar for movement in predetermined relation to the movement of the sine bar by the device, and means constraining the elements from movement of the elements out of one of said predetermined positions by the driving forces transmitted by the elements between the sine bar and member and for permitting said movement out of said one of said predetermined positions, selectively.

2. The structure according to claim 1 wherein additional means are provided and are operable for rendering the restraint of the constraining means yieldable and are operative to cause the constraining means to cease said restraint and, instead, to move the elements out of said one predetermined position.

3. The structure according to claim 2 wherein the elements are a cylinder and a piston reciprocable in the cylinder, respectively, one element is coaxial with and connected in fixed position on the member, the other is connected to the sine bar for movement thereby, the additional means include controllable means for supplying yieldable fluid pressure to one end of the cylinder, and to supply the fluid pressure to the other end of the cylinder and vent the pressure fluid at said one end of the cylinder, selectively.

4. The structure according to claim 1 wherein the means drivingly connecting the device and sine bar comprises a rack on, and extending endwise of, the device and movable therewith, a rack on and extending in the direction of movement of, and movable with, the sine bar, and a pair of co-rotative pinions in driving engagement with the racks, respectively.

5. In a machine tool including a housing, a power driven rotary spindle carried thereby, a work piece holding chuck, traversing power means to drive the spindle, housing and chuck endwise relatively toward each other, a threading tool carriage supported on the spindle for rotation therewith and movement inwardly and outwardly laterally relative thereto, a member extending endwise of the spindle, means supporting the member for movement in opposite directions endwise of, and relative to, the spindle and housing, power transmitting means rotatable with the spindle and drivingly connecting the member to the carriage for moving the carriage generally radially of the spindle in one direction when the member and spindle are moved endwise relative to each other in a predetermined direction, a work piece engaging device including a stop adapted to engage the end of a work piece held in the chuck, said device extending endwise through the spindle and being supported for movement endwise in opposite directions relative to the spindle, mechanism drivingly connecting the device and member and constraining the carriage to move in said one direction incrementally in a predetermined relation to the increments of endwise relative movement of the device and spindle upon movement of the spindle and chuck relatively toward each other by the traversing power means while the device is engaged by a work piece in the chuck, said mechanism including a sine bar, means drivingly connecting the device to the sine bar for moving the sine bar in predetermined relation to said endwise relative movement of the device and spindle, retractible and extensible means drivingly interconnecting the sine bar and member and including a pair of elements connected together for movement relative to each other to an extended position and to a retracted position, one of said elements being connected to said member for movement in predetermined relation to the endwise movement of the member, the other element being connected to the sine bar for movement in a predetermined relation to the movement of the sine bar by the device, an additional tool carriage mounted in the spindle for rotation therewith and movement toward and away from the axis of rotation of the spindle during rotation with the spindle and for movement axially of the spindle during said rotation with the spindle and movement toward and away from the axis, means connecting the additional tool carriage to the device in fixed position endwise of the device and for movement endwise with the device relative to the spindle, a cam in, and in fixed relation to, the spindle and disposed radially outwardly of the additional tool carriage and having a cam surface in camming engagement with the additional tool carriage for causing movement of said additional tool carriage in a direction toward the spindle axis consequent upon relative movement of the additional carriage axially of the spindle by the device, and a tool carried by said additional tool carriage in position to engage the stock and progressively perform a cutting operation on the stock during threading of the stock and endwise movement of the tool carriage by the device.

6. In a machine tool including a housing, a power driven rotary spindle carried thereby, a work piece holding chuck, traversing power means to drive the spindle housing, and chuck endwise relatively toward each other, a threading tool carriage supported by the spindle for rotation therewith and for movement in inward and outward directions laterally relative thereto, a work piece engaging device including a stop adapted to be engaged by the end of a work piece held in the chuck, said device extending endwise through the spindle and being supported thereby for movement endwise in opposite directions relative to the spindle, mechanism drivingly interconnecting the device and carriage and constraining the carriage to move in one of said directions incrementally in a predetermined relation to the increments of endwise relative movement of the device and spindle upon movement of the spindle and chuck relatively toward each other by the traversing power means while the device is engaged by a work piece in the chuck, an additional tool carriage mounted in the spindle for rotation therewith and movement toward and away from the axis of rotation of the spindle during rotation with the spindle and for movement axially of the spindle during said rotation with the spindle and movement toward and away from the axis, means connecting the additional tool carriage to the device, in fixed position endwise of the device, for movement endwise with the device relative to the spindle, a cam in, and in fixed relation to, the spindle and disposed radially outwardly from the additional tool carriage and having a cam surface in camming engagement with the additional tool carriage for causing movement of said additional tool carriage in a direction toward the spindle axis consequent upon relative movement of the additional carriage axially of the spindle by the device, and a tool carried by said additional tool carriage in position to engage the stock and progressively perform a cutting operation on the stock during threading of the stock and endwise movement of the tool carriage by the device.

7. The structure according to claim 5 wherein in one position of camming engagement of the additional tool carriage and cam surface, the cam causes a maximum inward movement of the additional tool carriage, and the cam surface beyond said one position in the direction of advance of the device during threading is interrupted so as to release the additional tool carriage for return outwardly fully out of cutting position prior to the completion of the threading operation.

8. The structure according to claim 6 wherein in one position of camming engagement of the additional tool carriage and cam surface, the cam causes a maximum inward movement of the additional tool carriage, and the cam surface beyond said one position in the direction of advance of the device during threading is interrupted so as to release the additional tool carriage for return outwardly fully out of cutting position prior to the completion of the threading operation.

9. In a machine tool including a housing, a power driven rotary spindle carried thereby, a workpiece holding chuck, traversing power means to drive the spindle housing and chuck endwise relatively toward each other, a threading tool carriage supported by the spindle for rotation therewith and for movement in inward and outward directions laterally relative thereto, a threading tool thereon, a workpiece engaging device including a stop adapted to be engaged by the end of a workpiece held in the chuck, said device extending endwise through the spindle and being supported thereby for movement endwise in opposite directions relative to the spindle, mechanism drivingly interconnecting the device and carriage and constraining the carriage to move in one of said directions incrementally in a predetermined relation to the increments of endwise relative movement of the device and spindle upon movement of the spindle and chuck relatively toward each other by the traversing power means while the device is engaged by a workpiece in the chuck, an additional tool carriage, a chamfering tool thereon, said additional carriage being mounted in the spindle for rotation therewith, and for movement toward and away from the axis of the spindle during rotation with the spindle, and for movement axially of the spindle relative to the threading tool carriage in a direction away from the chuck, during said rotation of the additional carriage with the spindle and movement of the additional carriage toward and away from the spindle axis, from a starting axial position to other axial positions wherein it is operable to cause the chamfer tool to chamfer the advancing leading end portion of the workpiece during continuance of the threading of said end portion, means operable by the advance of the workpiece to move the additional tool carriage from said starting position to said other positions, and means carried by the spindle and operatively connected to the additional carriage and operative, as the additional carriage is moved from said starting to said other positions, to move the additional carriage in one direction transversely of the spindle axis and thereby cause the chamfering tool to be operative to chamfer said advancing leading end portion.

References Cited in the file of this patent

UNITED STATES PATENTS

| | | |
|---|---|---|
| 877,925 | Hartness | Feb. 4, 1908 |
| 2,054,028 | Benninghoff | Sept. 8, 1936 |
| 2,195,645 | Gairing | Apr. 2, 1940 |
| 2,388,355 | Fether | Nov. 6, 1945 |
| 2,679,057 | Sawdey | May 25, 1954 |